United States Patent Office 2,818,421
Patented Dec. 31, 1957

2,818,421

SEPARATION OF MONO- FROM DIALKYL ACID PHOSPHATES

Nicolaas Max, Amsterdam, Netherlands, assignor to Shell Development Company, Emeryville, Calif., a corporation of Delaware No Drawing. Application January 7, 1954
Serial No. 402,816

Claims priority, application Netherlands February 2, 1953

12 Claims. (Cl. 260—461)

This invention relates to a process for separating monoalkyl esters of phosphoric acid from dialkyl esters of phosphoric acid.

One class of chemical compounds possessing highly desirable properties as surface-active agents comprises the alkyl acid phosphates, which can be prepared by reaction of higher aliphatic alcohols, such as nonyl, decyl, or lauryl alcohols, with phosphorus pentoxide. The products of this reaction are mixtures comprising primarily monoalkyl acid phosphates and dialkyl acid phosphates. While the surface-active properties of the mixtures of phosphates thus obtained are sufficient for some purposes, it has been found that the dialkyl acid phosphates possess surface-active properties substantially more desirable than those possessed by the monoalkyl acid phosphates. Hence, for many purposes, it becomes quite important that the two classes of phosphates be separated. It has been proposed to effect the separation of a mixture of mono- and dialkyl acid phosphates by fractional crystallization of suitable salts, particularly the barium salts, of these acid phosphates from water solutions. However, as stated by G. M. Kosolapoff ("Organophosphorus Compounds," Wiley and Sons (1950), at page 221 thereof) this separation method has not been found to be effective in separating the (higher alkyl)-substituted acid phosphates. It is an object of the present invention, therefore, to provide an effective, easily performed method for accomplishing the separation of mono(higher alkyl) acid phosphates from di(higher alkyl) acid phosphates and, hence, to provide a practical method for obtaining in substantially pure form the more desirable dialkyl acid phosphate.

It is my discovery that di(higher alkyl) acid phosphates may be almost completely removed from a mixture of mono(higher alkyl)-and di(higher alkyl) acid phosphates by extracting a mixture of the alkali metal or lower alkaline earth metal salts of these acid phosphates with at least one polar halogenated hydrocarbon. To be more specific, it has been discovered that, when an alkali metal or lower alkaline earth metal salt of a dialkyl acid phosphate in which the alkyl groups each contain at least 7 carbon atoms is present in admixture with a corresponding metallic salt of the corresponding monoalkyl acid phosphate, the salt of the dialkyl acid phosphate can be selectively extracted from the mixture by means of a polar halogenated hydrocarbon solvent. The process of the invention, therefore, comprises intimately contacting a mixture of the alkali metal or lower alkaline earth metal salts of alkyl-substituted acid phosphates with at least one polar halogenated hydrocarbon and separating the solution from the solid residue (which comprises the metallic salt of the monoalkyl acid phosphate). In another aspect, the process of the invention comprises converting the mixture of alkyl-substituted acid phosphates to the corresponding alkali metal or lower alkaline earth metal salts, extracting the mixture of salts with a polar halogenated hydrocarbon, separating the solution from the solid and treating the solid with a weak acid solution to convert it to the monoalkyl acid phosphate. The dialkyl acid phosphate may be recovered by distilling off the solvent and treating the resulting solid with a weak acid solution to spring the dialkyl acid phosphate.

The mixtures of alkyl-substituted acid phosphates to which this novel method of separation applied are mixtures of those acid phosphates in which the alkyl groups each contain at least 7 carbon atoms and a preferred class of these mixtures comprises mixtures of mono- and dialkyl-substituted acid phosphates in which each alkyl group contains from 8 to 18 carbon atoms, inclusive. The alkyl group may be of straight-chain configuration or it may have a branched-chain structure. Representative mixtures include, among others, mixtures of mono- and dinonyl acid phosphates, mono- and didecyl acid phosphates, mono- and dilauryl acid phosphates, mono- and dicetyl acid phosphates, mono- and dimyristyl acid phosphates, mono- and di-(3,5,5-trimethylhexyl) acid phosphates, mono- and di-(2,2,4-trimethylpentyl) acid phosphates, mono- and di-(2,3-dimethylhexyl) acid phosphates, mono- and di-(2-methyl-3-ethylpentyl) acid phosphates, and the like. A preferred mixture comprises that obtained by the reaction of those higher aliphatic alcohols known to the art as "oxo alcohols"—mixtures of alcohols containing from about 8 to about 18 carbon atoms per molecule—with phosphorus pentoxide.

The mixture of mono- and dialkyl acid phosphates may be prepared for separation by converting the alkyl-substituted acid phosphates to the corresponding alkali metal or lower alkaline earth metal salts. This may be accomplished by adding to the mixture of alkyl-substituted acid phosphates an aqueous solution of an alkali metal or lower alkaline earth metal hydroxide, in an amount sufficient to convert all of the alkyl-substituted acid phosphates to the corresponding metallic salts. It is desirable, to insure complete conversion, that a slight excess of the hydroxide be used; however, a large excess is undesirable for the reason that excess hydroxide must be neutralized before the desired alkyl-substituted acid phosphate can be sprung (by treatment with a weak acid) from the metallic salt. Thus, a large excess of the hydroxide results in an unnecessary and undesirable waste of the acid used to spring the desired monoalkyl acid phosphate. A convenient method for determining the excess of hydroxide present comprises measuring the pH of the solution. When determined by this technique, the desired excess of hydroxide is such that the final pH of the solution lies between about 9.0 and about 10.5, the optimum pH lying at about 10.0.

By the term "lower alkaline earth metal" is meant a metal classified in Group IIA of the Periodic Table of the Elements (as given in The Merck Index, sixth edition (1952)) having an atomic number below 40—e. g., the metals magnesium, calcium, beryllium and strontium. In general, it has been found that the solubility of the metallic salt of the dialkyl acid phosphates decreases with increasing atomic weight, the salts of the lighter members of this group of alkaline earth metals exhibiting the greatest solubility. Therefore, it is preferred that the alkaline earth metal salt or hydroxide employed in the process of the invention be a magnesium compound since the difference between the solubility of the magnesium salt of the dialkyl acid phosphate and that of the magnesium salt of the monoalkyl acid phosphate is greater than that of the corresponding calcium or strontium salts, and the beryllium salts are much less widely available at low cost.

By the term "alkali metal" is meant those metals of group I of the periodic table of the elements customarily designated by this terminology—e. g., lithium, sodium, potassium, and rubidium. In the process of the invention it is preferred to use the hydroxide of potassium or sodium inasmuch as these hydroxides are lower in cost and are more widely available than are the hydroxides of the other alkali metals.

In cases where the alkaline earth metal hydroxide is but sparingly soluble in water, an effective method for converting the alkyl-substituted acid phosphates to their alkaline earth metal salts comprises treating the mixture of acid phosphates with a solution of a water-soluble hydroxide, such as sodium or potassium hydroxide, and then reacting the resulting solution of mixed alkali metal salts with a water-soluble salt of the alkaline earth metal, such as the alkaline earth metal halide or nitrate, so that the alkaline earth metal salts of the alkyl-substituted acid phosphates are precipitated.

As the solubility of the alkali metal salts of the dialkyl esters is greater than that of the corresponding alkaline earth metal salts, it is preferred that the alkali metal hydroxides be used to effect the separation. Because of its low cost and ready availability, sodium hydroxide is preferred as the alkali metal hydroxide.

The temperature at which the conversion may be effected is not a critical factor in the process of the present invention. In general, while ordinary room temperatures will be satisfactory, a moderate increase in temperature may be desirable in some cases to attain complete reaction within a shorter time. For this purpose, temperatures below about 70° C. will be found suitable.

Following the conversion of the alkyl-substituted acid phosphates to the metallic salts, the mixture is prepared for selective extraction by removing substantially all of the water and any alcohol present in the mixture. It is essential that substantially all of the water and alcohol present be removed, since the solubility characteristics of the various salts present in water and/or alcohol differs from their solubility characteristics in polar halogenated hydrocarbons, and this difference may cause difficulty in separation if water and/or alcohol are present when extraction with the hydrocarbon is effected.

The separation of the metallic salts of the mono- and dialkyl acid phosphates is effected by intimately contacting the substantially anhydrous reaction mixture with at least one polar halogenated hydrocarbon as selective solvent. By the term "polar halogenated hydrocarbon" is meant any halogen-substituted hydrocarbon which has an electric dipole moment and it is preferred that the electric dipole moment of the halogenated hydrocarbon be at least 1.0 Debye unit. By the term "Debye unit" is meant that measurement of electric dipole moment normally given this name. One Debye unit is defined to equal $1 \times 10^{-18}$ electrostatic units. As used in this specification, the term "electric dipole moment" has its usual meaning—e. g., it is a description or measure of the magnitude of the dipolar electrostatic field existing in a given organic compound, the magnitude of the moment being the product of either of the two (opposite) electrostatic charges and the distance between those charges. Further, the term "electric dipole moment" is herein used to mean the electric dipole moment of a compound which is in the pure liquid state or is dissolved in a suitable solvent, the value of the moment being determined for the compound or solution at ordinary temperatures— e. g., about 20 to 25° C. The value(s) of such dipole moment(s) for given organic compounds in the pure form or in representative solvent are given in such compilations of physical data as "Tables of Electric Dipole Moments" compiled by L. G. Wesson, The Technology Press (1948).

Hydrocarbons which may be employed include halogenated aliphatic hydrocarbons such as chloroform, ethylene chloride, and bromide, methylene bromide, and iodide, cis-1,2-dibromoethylene, 1,1,2,2-tetrabromoethane, 1,1,2,2-tetrachloroethane, 1,1- and 1,2-dichloroethane, n-, sec-, and tert-butyl bromide, n- and isobutyl chloride, 1,1-, 1,3-, and 2,2-dichloropropane, isopropyl bromide and sec-butyl iodide; halogenated alicyclic hydrocarbons such as cyclopentyl bromide, bromocyclohexane, chlorocyclohexane, 1,1-dichlorocyclopropane, and the like; and halogenated aromatic hydrocarbons such as o- and m-dichlorobenzene, bromo- and iodobenzene, alpha-chlorotoluene, and the like. It is preferred that the halogenated hydrocarbon employed be a polar halogenated saturated aliphatic hydrocarbon, the polar halogenated lower alkanes such as chloroform, methylene chloride and 1,1-dichloroethane having been found to be most effective for effecting the desired separation. Mixtures of any of these compounds may also be used.

The extraction may be carried out in any manner known to the art. For example, the solvent and mixture of the metallic salts of the alkyl-substituted acid phosphates may simply be mixed or agitated together, or in some cases, such apparatus as a Soxhlet extractor be employed to advantage. Generally, the extraction may be carried out at room temperature, but in some cases moderately elevated temperatures (temperatures below about 150° C., for example) may be employed with advantage to accelerate the rate of solution. It is preferred that the extraction temperature be between about 20° C. and about 125° C. The amount of solvent employed will depend upon the particular mixture of metallic salts of alkyl-substituted acid phosphates to be separated, the metallic constituent of the salts, the solvent employed and the temperature contemplated. As a general rule, a slight excess of solvent over that theoretically required to effect complete solution of the metallic salt of the dialkyl acid phosphate may be employed to insure that complete solution does occur. The excess should not be great, however, since the metallic salt of the monoalkyl acid phosphate, although relatively quite insoluble in the solvent as compared to the metallic salt of the corresponding dialkyl acid phosphate, may be slightly soluble in the solvent and the employment of an amount of solvent greatly in excess of that required to effect complete solution of the metallic salt of the dialkyl acid phosphate thus would result in an unnecessary loss of the metallic salt of the monoalkyl acid phosphate and, further, would reduce the degree of separation. An excess of solvent of from about 1% to about 5% by weight over that theoretically required will be found entirely appropriate for this purpose.

The desired metallic salt of the monoalkyl-substituted acid phosphate remains as the residue following the extraction and may be converted to the monoalkyl ester by any of the methods known in the art for preparing organic acids from their salts. A suitable method consists of treating the metallic salt with a dilute solution of an acid, for example, a mineral acid such as hydrochloric acid in dilute aqueous solution, and separating the alkyl ester from the inorganic salt formed by means of a suitable organic solvent, such as a lower aliphatic alcohol or an aliphatic hydrocarbon.

The dialkyl acid phosphate may be obtained by evaporating the polar halogenated hydrocarbon in which it is dissolved and treating the resulting solid salt to spring the alkyl ester, as delineated above for the monoalkyl acid phosphate.

The invention is illustrated by the following specific examples. It is to be understood that there is no intention that the invention be limited in any manner by any details thereof, since many variations may be made within the scope of the claimed invention.

*Example I*

A mixture of phosphates resulting from the reaction of 1 part by weight of phosphorus pentoxide with 4 parts by weight of 3,5,5-trimethyl hexanol was treated with 1 N sodium hydroxide until the pH of the mixture is 10.0. The mixture was then steam distilled to remove unreacted trimethyl hexanol, and was further heated to remove substantially all the water. After removal of the water the mixture consisted of:

52.4% by weight sodium dinonyl phosphate,
44.4% by weight sodium mononyl phosphate, and
3.2% by weight sodium phosphate.

Portions of this mixture weighing 25 grams each were subjected to extraction with various polar halogenated hydrocarbons. The following table describes these extractions and the results thereof:

| Extraction Agent | Dissolved (grams) | Residue (grams) | Extraction Conditions |
|---|---|---|---|
| 1,2-Dichloroethane | 13.2 | 11.6 | Elevated temperature in Soxhlet apparatus. |
| 1,1-Dichloroethane | 13.3 | 11.7 | Do. |
| Chloroform | 13.4 | 11.5 | 18° C., digestion. |

*Example II*

A mixture of phosphates resulting from the reaction of 152 grams of phosphorus pentoxide and 608 grams of 3,5,5-trimethyl hexanol was treated with 1 N aqueous sodium hydroxide solution until the pH of the mixture was 10.2. The unreacted alcohol was removed by steam distillation, and a stoichiometric quantity of calcium nitrate, in the form of an aqueous solution containing 10% by weight calcium nitrate, was added. The precipitate was filtered off, dried and extracted with chloroform. Separation of the salts was substantially complete.

I claim as my invention:

1. A process for the separation of monoalkyl acid phosphates from dialkyl acid phosphates, in each of which phosphates each alkyl group contains at least seven carbon atoms which comprises selectively extracting a mixture of the metallic salts of said monoalkyl and dialkyl acid phosphates with at least one polar halogenated hydrocarbon having an electric dipole moment of at least about one Debye unit, said metallic salts being salts of a member of the group consisting of the alkali metals and the alkaline earth metals having atomic numbers below 40, and separating the solid metallic salt of the monoalkyl acid phosphate from the resulting mixture.

2. A process for the separation of monoalkyl acid phosphates from dialkyl acid phosphates in each of which phosphates each alkyl group contains at least seven carbon atoms which comprises selectively extracting a mixture of the alkali metal salts of said monoalkyl and dialkyl acid phosphates with at least one polar halogenated hydrocarbon having an electric dipole moment of at least one Debye unit.

3. The process of claim 2 in which the solvent is chloroform.

4. The process of claim 2 in which the solvent is methylene chloride.

5. The process of claim 2 in which the solvent is 1,1-dichloroethane.

6. The process of claim 2 in which the alkali metal is sodium.

7. A process for the separation of monoalkyl acid phosphates from dialkyl acid phosphates in each of which phosphates each alkyl group contains at least seven carbon atoms which comprises selectively extracting a mixture of the salts of said monoalkyl and dialkyl acid phosphates and an alkaline earth metal having an atomic number below 40 with at least one polar halogenated hydrocarbon having an electric dipole moment of at least one Debye unit.

8. The process of claim 7 wherein the alkaline earth metal is magnesium.

9. The process of claim 7 wherein the alkaline earth metal is calcium.

10. A process for the separation of monoalkyl acid phosphates from dialkyl acid phosphates in each of which phosphates each alkyl group contains at least seven carbon atoms which comprises converting the said alkyl acid phosphates to metallic salts thereof, said metallic salts being salts of a member of the group consisting of the alkali metals and alkaline earth metals having atomic numbers below 40, removing substantially all the water present and selectively extracting the metallic salt of the dialkyl acid phosphate by intimately contacting the mixture with at least one polar halogenated hydrocarbon having an electric dipole moment of at least one Debye unit.

11. A process for the separation of monoalkyl acid phosphates from dialkyl acid phosphates in each of which phosphates each alkyl group contains at least seven carbon atoms which comprises converting the said alkyl-substituted acid phosphates to the corresponding alkali metal salts, removing any water present, and removing the alkali metal salt of the dialkyl acid phosphate by contacting the mixture of salts with at least one polar halogenated hydrocarbon having an electric dipole moment of at least one Debye unit.

12. A process for the separation of monoalkyl acid phosphates from dialkyl acid phosphates in each of which phosphates each alkyl group contains at least seven carbon atoms which comprises converting the said alkyl-substituted acid phosphates to the corresponding salts of an alkaline earth metal having an atomic number below 40, removing any water present, and removing the lower alkaline earth metal salt of the dialkyl acid phosphate by contacting the mixture of salts with at least one polar halogenated hydrocarbon having an electric dipole moment of at least one Debye unit.

References Cited in the file of this patent

UNITED STATES PATENTS

| | | |
|---|---|---|
| 1,869,768 | Nicolai et al. | Aug. 2, 1932 |
| 2,193,965 | Hochwalt | Mar. 19, 1940 |
| 2,573,658 | Weesner | Oct. 30, 1951 |
| 2,658,909 | Crandall et al. | Nov. 10, 1953 |

OTHER REFERENCES

Chemical Trade Journal & Chemical Engineer, p. 62, Jan. 16, 1942.

Kosolapoff-Organic Phosphorus Compounds, page 221, 1950.

Stewart et al.: Jour. A. C. S., vol. 73, pp. 1377–8, 1951.